US011514563B2

(12) United States Patent
Strandemar

(10) Patent No.: US 11,514,563 B2
(45) Date of Patent: Nov. 29, 2022

(54) INFRARED RESOLUTION AND CONTRAST ENHANCEMENT WITH FUSION

(71) Applicant: FLIR Systems AB, Täby (SE)

(72) Inventor: Katrin Strandemar, Rimbo (SE)

(73) Assignee: FLIR Systems AB, Täby (SE)

( * ) Notice: Subject to any disclaimer, the term of this patent is extended or adjusted under 35 U.S.C. 154(b) by 148 days.

(21) Appl. No.: 16/372,260

(22) Filed: Apr. 1, 2019

(65) Prior Publication Data
US 2019/0228513 A1 Jul. 25, 2019

Related U.S. Application Data

(63) Continuation of application No. 15/267,133, filed on Sep. 15, 2016, now Pat. No. 10,249,032, which is a
(Continued)

(51) Int. Cl.
*G06K 9/00* (2022.01)
*G06T 5/50* (2006.01)
(Continued)

(52) U.S. Cl.
CPC .............. *G06T 5/50* (2013.01); *G06T 5/003* (2013.01); *H04N 5/33* (2013.01);
(Continued)

(58) Field of Classification Search
CPC . G06T 5/50; G06T 5/003; G06T 2207/10024; G06T 2207/10048; G06T 2207/20221; H04N 5/33
(Continued)

(56) References Cited

U.S. PATENT DOCUMENTS 4,661,986 A 4/1987 Adelson
5,140,416 A 8/1992 Tinkler
(Continued)

FOREIGN PATENT DOCUMENTS

CN 1507742 6/2004
CN 1545064 11/2004
(Continued)

OTHER PUBLICATIONS

Landsat Science, The Thematic Mapper, publication, Aug. 9, 2013 (Aug. 9, 2013), 1 page, NASA Publications, URL: http://landsat.gsfc.nasa.gov/?p=3229.
(Continued)

*Primary Examiner* — Andrew M Moyer
(74) *Attorney, Agent, or Firm* — Haynes and Boone, LLP

(57) ABSTRACT

The present disclosure relates to combination of images. A method according to an embodiment comprises: receiving a visual image and an infrared (IR) image of a scene and for a portion of said IR image extracting high spatial frequency content from a corresponding portion of said visual image. The method according to the embodiment further comprises combining said extracted high spatial frequency content from said portion of the visual image with said portion of the IR image, to generate a combined image, wherein the contrast and/or resolution in the portion of the IR image is increased compared to the contrast and/or resolution of said received IR image.

18 Claims, 12 Drawing Sheets

Related U.S. Application Data continuation of application No. 14/922,076, filed on Oct. 23, 2015, now Pat. No. 9,471,970, which is a continuation of application No. 13/437,645, filed on Apr. 2, 2012, now Pat. No. 9,171,361, which is a continuation-in-part of application No. 13/105,765, filed on May 11, 2011, now Pat. No. 8,565,547, which is a continuation of application No. PCT/EP2011/056432, filed on Apr. 21, 2011, said application No. 13/437,645 is a continuation-in-part of application No. 12/766,739, filed on Apr. 23, 2010, now Pat. No. 8,520,970, said application No. PCT/EP2011/056432 is a continuation-in-part of application No. 12/766,739, filed on Apr. 23, 2010, now Pat. No. 8,520,970.

(60) Provisional application No. 61/473,207.

(51) Int. Cl.
*G06T 5/00* (2006.01)
*H04N 5/33* (2006.01)

(52) U.S. Cl.
CPC ............ *G06T 2207/10024* (2013.01); *G06T 2207/10048* (2013.01); *G06T 2207/20221* (2013.01)

(58) Field of Classification Search
USPC ........................................ 382/100, 254–275
See application file for complete search history.

(56) References Cited

U.S. PATENT DOCUMENTS

| | | | |
|---|---|---|---|
| 5,488,674 A * | 1/1996 | Burt | G06T 5/50 345/639 |
| 5,555,324 A | 9/1996 | Waxman et al. | |
| 7,620,265 B1 | 11/2009 | Wolff et al. | |
| 7,876,973 B2 | 1/2011 | Fairbanks et al. | |
| 8,520,970 B2 | 8/2013 | Strandemar | |
| 8,565,547 B2 | 10/2013 | Strandemar | |
| 8,836,793 B1 | 9/2014 | Kriesel et al. | |
| 2001/0016064 A1* | 8/2001 | Tsuruoka | H04N 5/35527 382/167 |
| 2002/0015536 A1 | 2/2002 | Warren et al. | |
| 2002/0058352 A1 | 5/2002 | Jacksen et al. | |
| 2003/0122969 A1* | 7/2003 | Higuchi | H04N 5/357 348/607 |
| 2004/0101162 A1* | 5/2004 | Higaki | G06T 7/215 382/103 |
| 2006/0043296 A1* | 3/2006 | Mian | G01J 5/0846 250/330 |
| 2006/0132642 A1* | 6/2006 | Hosaka | H04N 5/332 348/370 |
| 2006/0268110 A1* | 11/2006 | Koike | G06T 5/50 348/159 |
| 2007/0177819 A1 | 8/2007 | Ma et al. | |
| 2008/0285853 A1* | 11/2008 | Bressan | G06T 5/40 382/169 |
| 2009/0050806 A1* | 2/2009 | Schmidt | H04N 5/2258 250/332 |
| 2009/0169102 A1* | 7/2009 | Zhang | G06T 5/50 345/639 |
| 2009/0190915 A1 | 7/2009 | Leonelli, Jr. | |
| 2011/0261207 A1 | 10/2011 | Strandemar | |
| 2012/0262584 A1 | 10/2012 | Strandemar | |
| 2014/0015982 A9 | 1/2014 | Strandemar | |

FOREIGN PATENT DOCUMENTS

| | | |
|---|---|---|
| CN | 101226635 | 7/2008 |
| CN | 101339653 | 1/2009 |
| CN | 101404084 | 4/2009 |
| CN | 101546428 | 9/2009 |
| CN | 101825516 | 9/2010 |
| EP | 0973137 | 1/2000 |
| GB | 2442512 | 4/2008 |
| JP | 2004241491 | 8/2004 |
| JP | 2005-031800 | 2/2005 |
| KR | 2006-0071893 | 6/2006 |
| WO | WO 2000/23814 | 4/2000 |
| WO | WO 2011/131758 | 10/2011 |

OTHER PUBLICATIONS

Chavez et al., "Comparison of Three Different Methods to Merge Multiresolution and Multispectral Data: Landsat TM and SPOT Panchromatic", Archives of Ophthalmology, American Medical Association, vol. 57, No. 3, Mar. 1, 1991, pp. 295-303.

Chen et al., "An Infrared Image Fusion Algorithm Based on Lifting Wavelet Transform", Laser & Infrared, Jan. 31, 2009, pp. 97-100, vol. 39, No. 1.

Yan Jixiang, "Infrared Image Sequence Enhancement Based on Wavelet Transform", Full-Text Database of China Excellent Master Degree Thesis, Information Technology Collection, Jan. 15, 2009, pp. 1-69, No. 01, China.

Gangkofner, Ute G. et al., "Optimizing the High-Pass Filter Addition Technique for Image Fusion," Photogammetric Engineering & Remote Sensing, vol. 74, No. 9, Sep. 1, 2008, pp. 1107-1118.

King et al., "A Wavelet Based Algorithm for Pan Sharpening Landsat 7 Imagery", IEEE, vol. 2, Jul. 9, 2001, pp. 849-851.

Ager, Thomas P., et al., "Geo-positional Accuracy Evaluation of QuickBird Ortho-Ready Standard 2A Multispectral Imagery," Algorithms and Technologies for Multispectral, Hyperspectral, and Ultraspectral Imagery X, Aug. 12, 2004, pp. 488-499, vol. 5425, Bellingham/US.

Wang et al., "An algorithm to fuse gray-scale infrared and visible light image Based on perceptual color space", Abstract only, Journal of Optoelectronics Laser, Sep. 19, 2008, 4 pages, vol. 19, No. 9, China.

* cited by examiner

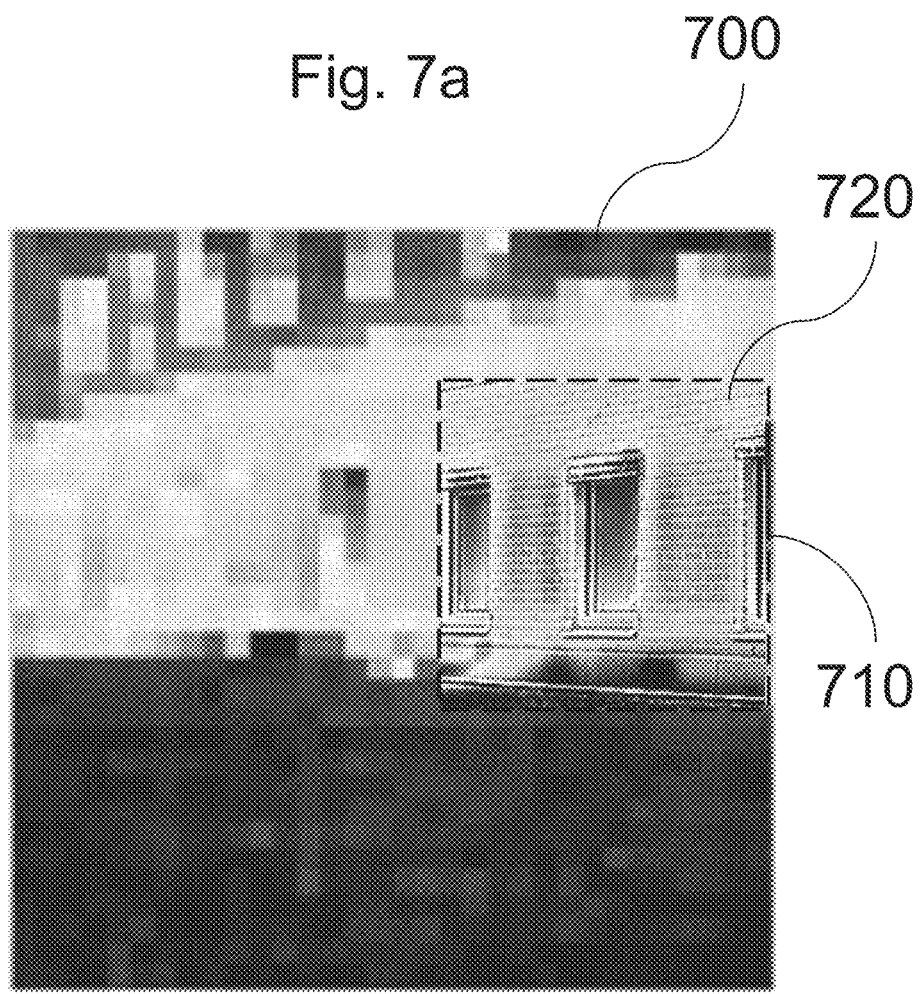

INFRARED RESOLUTION AND CONTRAST ENHANCEMENT WITH FUSION

CROSS REFERENCE TO RELATED APPLICATIONS

This patent application is a continuation of U.S. patent application Ser. No. 15/267,133, filed Sep. 15, 2016. U.S. patent application Ser. No. 15/267,133 is a continuation of U.S. patent application Ser. No. 14/922,076, filed Oct. 23, 2015. U.S. patent application Ser. No. 14/922,076 is a continuation of U.S. patent application Ser. No. 13/437,645, filed Apr. 2, 2012. U.S. patent application Ser. No. 13/437,645 is a continuation-in-part of U.S. patent application Ser. No. 12/766,739, filed Apr. 23, 2010. U.S. patent application Ser. No. 13/437,645 also claims the benefit of U.S. Provisional Patent Application No. 61/473,207, filed Apr. 8, 2011. U.S. patent application Ser. No. 13/437,645 is also a continuation-in-part of U.S. patent application Ser. No. 13/105,765, filed May 11, 2011, which is a continuation of PCT Patent Application No. PCT/EP2011/056432, filed Apr. 21, 2011, which is a continuation-in-part of U.S. patent application Ser. No. 12/766,739, filed Apr. 23, 2010. U.S. patent application Ser. No. 13/105,765 is also a continuation-in-part of U.S. patent application Ser. No. 12/766,739, filed Apr. 23, 2010. PCT Patent Application No. PCT/EP2011/056432 also claims the benefit of U.S. Provisional Patent Application No. 61/473,207, filed Apr. 8, 2011. All of the above patent applications are incorporated herein by reference in their entirety.

TECHNICAL FIELD

The present disclosure relates to a method, imaging device, software, and system for improving an infrared (IR) image.

BACKGROUND

Within the area of image processing, an IR image of a scene comprising one or more objects can be enhanced by combination with image information from a visual image, said combination being known as fusion. A number of technical problems arise when attempting to accomplish such combination and enhancement.

Typically, an imaging device in the form of a camera is provided to capture a visual image and an IR image and to process these images so that they can be displayed together. The combination is advantageous in identifying variations in temperature in an object using IR data from the IR image while at the same time displaying enough data from the visual image to simplify orientation and recognition of objects in the resulting image for a user using the imaging device.

Since the capturing of the IR image and the visual image may be performed by different components of the imaging device, the optical axes between the imaging components may be at a distance from each other and an optical phenomenon known as parallax will arise. To eliminate this and the error arising from an angle between the optical axes, the images must be aligned.

When combining an IR image with a visual image, a number of different methods are known. The most commonly used are known as threshold fusion and picture-in-picture fusion.

In a method for performing a threshold fusion of images, a visual image and an IR image of the same scene are captured. In the IR image, a temperature interval is selected and only those pixels of the image that correspond to temperatures inside the selected interval are chosen and displayed together with information data from all other pixels. The resulting combination image shows the visual image except for those areas where a temperature inside the selected interval can be detected and displays data from the IR image in these pixels instead. For example, when a wet stain on a wall is to be detected, a threshold fusion can be used for determining the extent of the moisture by setting the temperature threshold to an interval around the temperature of the liquid creating the stain. Other parts of the wall will be closer to room temperature and will show up as visual data on a screen, so that the exact position of the stain can be determined. By seeing a texture of the wall, for instance a pattern of a wallpaper, the location of the stain can be further determined in a very precise way.

When performing picture-in-picture fusion, a visual image and an IR image showing the same scene comprising one or more objects are captured, and the pixels inside a predetermined area, often in the form of a square, are displayed from the IR image while the rest of the combined image is shown as visual data. For example, when detecting a deviation in a row of objects that are supposed to have roughly the same temperature, a square can be created around a number of objects and moved until a faulty object is captured besides a correctly functioning one and the difference will be easily spotted. By displaying elements from the visual image outside this square, such as text or pattern, for instance, the precise location of the objects with a specific temperature can be more easily and reliably determined.

The methods for threshold fusion and picture-in-picture fusion all display the chosen section of the combined image as IR data while the rest is shown as visual data. This has the disadvantage that details that are visible in the visual image are lost when showing IR data for the same area. Likewise, temperature data from the IR image cannot be shown together with the shape and texture given by the visual image of the same area.

Some methods exist for blending IR data and visual data in the same image. However, the results are generally difficult to interpret and can be confusing to a user since temperature data from the IR image, displayed as different colors from a palette or different grey scale levels, are blended with color data of the visual image. As a result, the difference between a red object and a hot object, for instance, or a blue object and a cold object, can be impossible to discern. Generally, the radiometric or other IR related aspects of the image, i.e. the significance of the colors from the palette or grey scale levels, are lost when blending the IR image with the visual image.

Thus, there exists a need for an improved way of providing a combined image comprising data from an IR image and data from a visual image together.

SUMMARY

One or more embodiments of the present disclosure may solve or at least minimise the problems mentioned above. This is achieved by a method, an imaging device, and/or a non-transitory computer program product according to the claims, where an IR image is combined with high spatial frequency content of a visual image to yield a combined image. According to embodiments, the imaging device comprises a processing unit (e.g., a processor, a programmable logic device, or other type of logic device) configured to perform any or all of the method steps of the method embodiments described herein. The combination is performed through superimposition of the high spatial frequency content of the visual image and the IR image, or alternatively superimposing the IR image on the high spatial frequency content of the visual image. As a result, contrasts from the visual image can be inserted into an IR image showing temperature variations, thereby combining the advantages of the two image types without losing clarity and interpretability of the resulting combined image.

More specific aspects of the embodiments of the present disclosure are explained below.

The method according to an embodiment of the present invention comprises ensuring that the resolutions of the images to be combined, i.e. the resolution of a visual image and an IR image, are substantially the same. According to embodiments described herein, the images may have substantially the same resolution when they are captured, or the images may require processing in order to ensure that they have substantially the same resolution before remaining method steps are performed. Embodiments for ensuring that the images have substantially the same resolution are presented herein.

In a first exemplary embodiment, this (e.g., ensuring that the resolution of a visual image and an IR image are substantially the same) may be performed by configuring an imaging device with an IR sensor and a visual image sensor, such that the IR sensor and the visual image sensor have substantially the same resolution. In another alternative embodiment, the resolutions of the imaging sensors are previously known not to be substantially the same, for example to differ more than a predetermined difference threshold value. In yet another alternative embodiment, if the resolutions of the imaging sensors are not previously known, the inventive method may include a step of checking whether the resolutions of the received images are substantially the same. Checking may be performed through comparison of the resolutions of the received images, wherein information on the resolutions of the images may either be available from the separate imaging sensors or retrieved from/calculated based on the received images. If the resolutions are found not to be substantially the same, either through previous knowledge of the sensor resolutions or through checking of the resolutions, the ensuring that the resolutions are substantially the same further includes re-sampling of at least one of the received images.

The method according to another embodiment comprises receiving a visual image and an infrared (IR) image of a scene and for a portion of said IR image extracting high spatial frequency content from a corresponding portion of said visual image, i.e. corresponding to the portion of the IR image. According to an embodiment, the corresponding portion of the visual image is the portion that shows the same part of the observed real world scene as the portion of the IR image. The method embodiment further comprises combining said extracted high spatial frequency content from said portion of said visual image with said portion of the IR image, to generate a combined image, wherein the contrast and/or resolution in the portion of the IR image is increased compared to the contrast of said captured IR image.

According to an embodiment, the resolution of the captured visual image and the resolution of the captured IR image are substantially the same.

According to different embodiments, said portion of the IR image may be the entire IR image or a sub portion of the entire IR image and said corresponding portion of the visual image may the entire visual image or a sub portion of the entire visual image.

According to an embodiment, said portion is predetermined. According to an embodiment, the method further comprises receiving a control signal indicating a manual selection of a portion of said IR image. According to an embodiment, said portion of the IR image is a predetermined area in the IR image.

According to an embodiment, said portion of the IR image and said corresponding portion of said visual image are scaled to a predetermined size. According to embodiments, said predetermined size is a selection of: the size of the captured IR image; the size of the captured visual image; and the size of a display onto which the combined image is to be displayed.

According to an embodiment, said portion of the IR image and said corresponding-portion of said visual image are resampled to match a predetermined resolution. According to embodiments, said predetermined resolution is a selection of: the resolution of the captured IR image; the resolution of the captured visual image; and the resolution of a display onto which the combined image is to be displayed.

Since the resolution of an IR image is generally much lower than that of a visual image, due to properties of an IR imaging device compared to a visual imaging device, the resolution of the IR image may be up-sampled to be substantially the same as the resolution of the visual image. As a result, an increased level of detail can be achieved and a more easily analysed combined image presented to a user. In another example, the visual image can be down-sampled to be substantially the same as the resolution of the IR image.

In a further example, both images can be sampled to fit a third resolution, if suitable. Both images may originally have substantially the same resolution, or the resolution of the images may differ. After the resampling to fit the third resolution however, both images will have substantially the same resolution. This enables the images to be combined in a manner that is convenient and suitable regardless of how they are to be displayed. In one example, the third resolution can be that of a display screen where the combined image is to be displayed.

Additionally, extraction of high spatial frequency content in the visual image and de-noising and/or blurring of the IR image, or a portion of the IR image, may preferably be performed. Typically, this is achieved by high pass filtering the visual image and low pass filtering the IR image, or the portion of the IR image, by use of spatial filters that are moved across the images, pixel by pixel. It is evident to a person skilled in the art that other well-known image processing methods may be used to render the same result. As a result of the filtering performed on the IR image, or the portion of the IR image, the IR image, or the portion of the IR image, can be rendered smooth and/or contain a reduced amount of noise compared to the original IR image. Additionally, the high spatial frequency content extracted from the visual image contains information on large contrasts in the visual image, i.e. information on where sharp edges such as object contours are located in the visual image. The step of performing filtering of the IR image is optional. The method for an embodiment of the present invention gives beneficial effects on the resulting image shown to the user even without the filtering of the IR image and a user would be able to clearly discern one or more objects in the scene depicted in the IR image, or the portion of the IR image, and the temperature information in connection with the imaged scene. However, since sharp edges and noise visible in the original IR image, or the portion of the IR image, are removed or at least diminished in the filtering process, the visibility in the resulting image may be further improved through the filtering of the IR image and the risk of double edges showing up in a combined image where the IR image and the visual image are not aligned is reduced.

Besides high pass filtering, examples of methods for extracting high spatial frequency content in an image may include extracting the difference (commonly referred to as a difference image) between two images depicting the same scene, where a first image is captured at one time instance and a second image is captured at a second time instance, preferably close in time to the first time instance. The two images may typically be two consecutive image frames in an image frame sequence. High spatial frequency content, representing edges and contours of the objects in the scene, will appear in the difference image unless the imaged scene is perfectly unchanged from the first time instance to the second, and the imaging sensor has been kept perfectly still. The scene may for example have changed from one frame to the next due to changes in light in the imaged scene or movements of depicted objects. Also, in almost every case the imaging sensor will not have been kept perfectly still.

If the imaging device is handheld, it is evident that there will be movements caused by the user of the imaging device. If the camera is stationary, for example on a stand, vibrations of the imaging device or the surroundings may cause movements of the imaging sensor. Vibrations of the imaging device may for example be caused by image stabilization systems, which are commonly used in visual imaging devices in order to compensate for movements of the imaging device. Different ways of accomplishing image stabilization is well known in the art. In an imaging device having an image stabilization system, the imaging sensor may be placed on an element that enables moving the imaging sensor in response to measured movements of the imaging device. This construction could be used to capture edges/contours in difference images, if the movements of the imaging sensor are controlled to correspond to a certain, predefined difference between consecutive image frames. In this case, the difference may further correspond to a certain width of the edges/contours of the difference image, the width being chosen according to circumstances.

Another way of obtaining images from which a difference image can be derived is to use the focus motor of the imaging device to move one or more lenses of the imaging device. The use of a focus motor for moving lenses in an imaging device is well known in the art. In this case, an image captured by the imaging device when it is slightly out of focus would be a smoothed and de-noised image that could directly correspond to a low-pass filtered image. After the focus of the imaging device has been reset, a focused image may be captured and the high spatial frequency content of the focused image may be obtained by subtracting the out-of-focus image from the focused image.

The approaches of using vibrations of the imaging sensor of refocusing of one or more lenses in the imaging device further do not necessarily require any digital image processing and could therefore be used in connection with analog imaging devices. As is evident to a person skilled in the art, by subtracting the extracted high spatial frequency content obtained by any of the methods described above from an image a corresponding low-pass filtered version of the image is obtained, since only the lower spatial frequency content remains after the subtraction. When combining the images, adding the high pass filtered or extracted high spatial frequency content of the visual image, or the portion of the visual image, to the IR image, or to the portion of the IR image, adds contours and contrasts to the IR image, or to the portion of the IR image, but does not otherwise alter it. As a result, the borders and edges of objects captured by the images can clearly be seen in the combined image, while at the same time maintaining a high level of radiometry or other relevant IR information.

In one example, to preserve the color or grey scale palette of the IR image, only the luminance component of the filtered visual image, or the portion of the filtered visual image, may be added to the IR image, or to the portion of the IR image. As a result, the colors are not altered and the properties of the original IR palette maintained, while at the same time adding the desired contrasts. To maintain the IR palette through all stages of processing and display is beneficial, since the radiometry or other relevant IR information may be kept throughout the process and the interpretation of the combined image may thereby be facilitated for the user.

When combining the luminance of the visual image, or the portion of the visual image, with the IR image, or with the portion of the IR image, a factor alpha can be used to determine the balance between the two images. This factor can be decided by the imaging device or imaging system itself, using suitable parameters for determining the level of contour needed from the visual image to create a good image, but can also be decided by a user by giving an input to the imaging device or imaging system. The factor can also be altered at a later stage, such as when images are stored in the system or in a PC or the like and can be adjusted to suit any demands from the user.

Before displaying the resulting combined image to a user, high resolution noise may be added to the image in order to create an impression of high resolution and increased detail and make the image more easily interpreted by the user.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 3a shows an IR image in halftone.

FIG. 3c shows extracted high spatial frequency content of a visual image in halftone, in this example obtained by high pass filtering.

FIG. 7a shows a combined image according to an embodiment.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
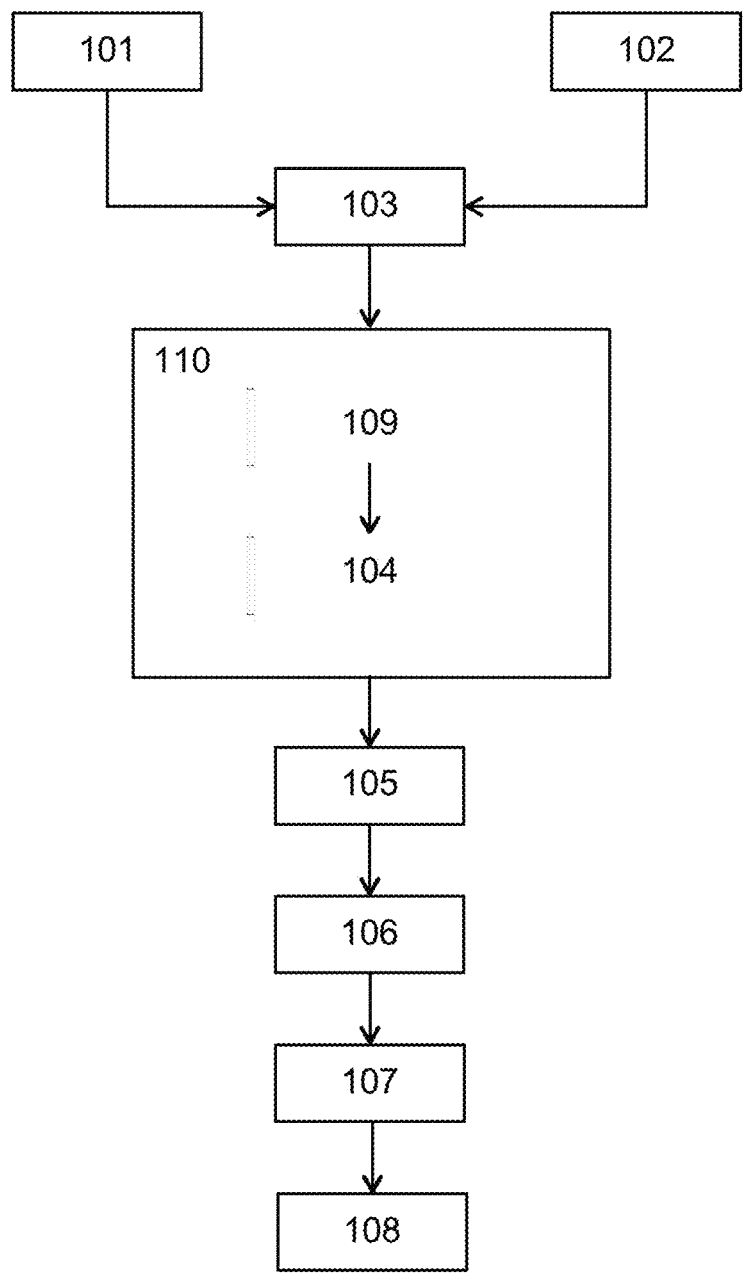
FIG. 1 shows a flow chart of a method according to an exemplary embodiment.

In FIG. 1, an exemplary method according to an embodiment of the present disclosure can be seen. At block 101 a visual image is captured and at block 102 an IR image is captured. The visual image and IR image may be captured by an optical sensor and an IR sensor, respectively. After capture, the visual image and the IR image may be aligned at block 103 to compensate for the parallax between the optical axes that generally arises due to differences in placement of the sensors for capturing said images and the angle created between these axes because of mechanical tolerances that generally prevents them being mounted exactly parallel.

The blocks 101, 102 can be performed simultaneously or one after the other. In one example, the images may be captured at the same time or with as little time difference as possible, since this will decrease the risk for alignment differences due to movements of an imaging device unit capturing the visual and IR images. As is readily apparent to a person skilled in the art, images captured at time instances further apart may also be used.

After alignment at block 103, ensuring that the visual image resolution and the IR image resolution are substantially the same is performed at block 110. In a first exemplary embodiment, this may be performed by configuring an imaging device with an IR sensor and a visual image sensor, such that the IR sensor and the visual image sensor have substantially the same resolution. In another exemplary embodiment, the resolutions of the imaging sensors are previously known not to be substantially the same, for example to differ more than a predetermined difference threshold value. In yet another exemplary embodiment, if the resolutions of the imaging sensors are not previously known, the inventive method may include a step of checking whether the resolutions of the received images are substantially the same at block 109. Checking may be performed through comparison of the resolutions of the received images, wherein information on the resolutions of the images may either be available from the separate imaging sensors or retrieved from or calculated based on the received images. If the resolutions are found not to be substantially the same, either through previous knowledge of the sensor resolutions or through checking of the resolutions, the ensuring that the resolutions are substantially the same further includes re-sampling of at least one of the received images at block 104.

According to an embodiment, the method steps are performed for a portion of the IR image and a corresponding portion of the visual image. According to an embodiment, the corresponding portion of the visual image is the portion that shows the same part of the observed real world scene as the portion of the IR image. According to different embodiments, the corresponding part of the visual image may be detected or identified using alignment and/or stabilization of the images; object or feature detection; and/or known relationships between the imaging devices 11, 12 (FIG. 4 and described further herein), such as parallax and pointing errors known from design, production, and/or calibration of the imaging device unit 1 (shown and described in reference to FIG. 4). According to an embodiment, the method comprises receiving a visual image and an infrared (IR) image of a scene and for a portion of said IR image extracting high spatial frequency content from a corresponding portion of said visual image, i.e. corresponding to the portion of the IR image. In this embodiment, high spatial frequency content is extracted from the portion of the visual image, and the portion of the IR image is combined with the extracted high spatial frequency content of the portion of the visual image, to generate a combined image, wherein the contrast and/or resolution in the portion of the IR image is increased compared to the contrast of the originally captured IR image.

According to an embodiment, the resolution of the captured visual image and the resolution of the captured IR image are substantially the same.

According to different embodiments, said portion of the IR image may be the entire IR image or a sub portion of the entire IR image and said corresponding portion of the visual image may be the entire visual image or a sub portion of the entire visual image. In other words, according to an embodiment the portions are the entire IR image and a corresponding portion of the visual image that may be the entire visual image or a subpart of the visual image if the respective IR and visual imaging systems have different fields of view.

According to an embodiment, the identified portion of the IR image is predetermined, e.g. comprising a predetermined area or region of the IR image. According to another embodiment, the method further comprises receiving a control signal indicating a manual selection of a portion of said IR image.

According to another embodiment, the portions comprise a subpart of the IR image and a corresponding subpart of the visual image, respectively, whereby the high frequency content of said subpart of the visual image is in the last step combined with said subpart of the IR image. According to an embodiment, wherein the portion of the IR image is a subpart of the captured IR image, the resulting combined image can be seen as a "picture in picture" image, comprising the captured IR image and the IR image portion with increased contrast from adding high frequency content added from the corresponding portion of the visual image. An example of a resulting "picture in picture" image according to one or more embodiments of the invention is shown in FIG. 7a, showing an IR image 700 wherein the portion 720, having increased contrast and/or resolution, is indicated with a dotted outline 710, for improved visibility. Such an outline or other indicating information may optionally be present in the combined image displayed to the user.

According to one or more embodiments, wherein the portions are subparts of the IR and visual images respectively, the portion of the IR image and said corresponding portion of said visual image may be scaled to a predetermined size. According to an embodiment, said portion of the IR image and said corresponding portion of said visual image are resampled to match a predetermined resolution. According to one or more embodiments, said predetermined resolution is a selection of: the resolution of the captured IR image; the resolution of the captured visual image; and the resolution of a display onto which the combined image is to be displayed.

Figure 7B:
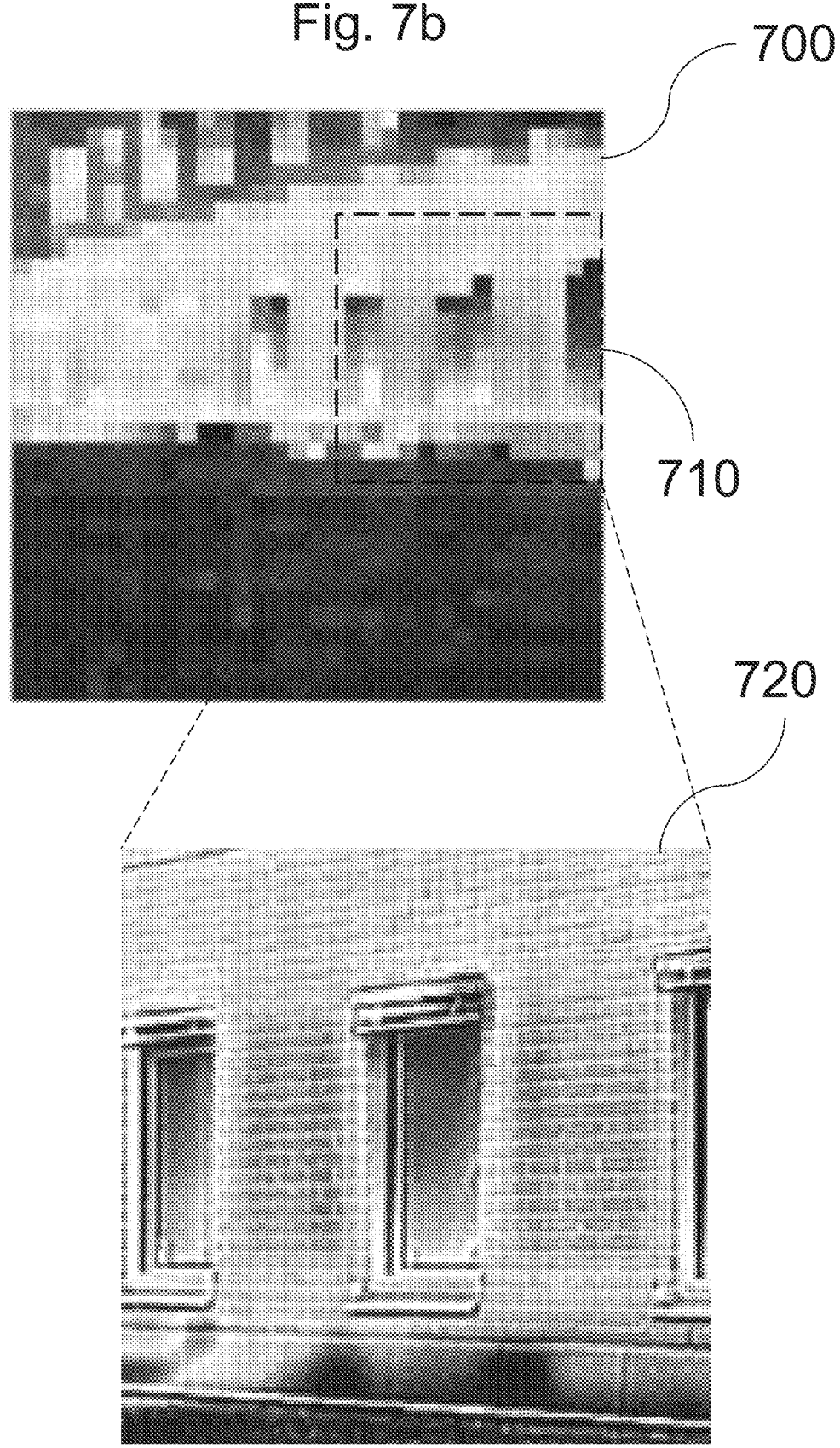
FIG. 7b shows scaling of a portion of an IR image and a resulting combined image according to an embodiment.

According to one or more embodiments, said predetermined size is a selection of: the size of the captured IR image; the size of the captured visual image; and the size of a display onto which the combined image is to be displayed. In other words, the corresponding portions may for instance be scaled to fit the resolution of the captured IR image, the captured visual image, or a display onto which the combined image is to be displayed. According to an embodiment, the portions are scaled to match the resolution of the captured IR image. The scaling according to different embodiments may be performed either before the extraction of high spatial frequency content described below, directly after the extraction, or after the combination of the high spatial frequency content with the portion of the IR image. According to all these scaling embodiments, the scaled version of the combined image may then be stored and or presented to a user on a display integrated in or coupled to the imaging device unit used for capturing the images. In FIG. 7b, an example of a manual or an automatic/predetermined selection of a portion corresponding to an area (e.g., portion 720 having dotted outline 710) of the IR image 700 is shown. Furthermore, FIG. 7b shows a resulting combined image portion 720 that has been scaled to fit a larger resolution, for example the resolution of a certain display. In FIGS. 7a and 7b the portions are shown as rectangular areas. As is readily apparent to a person skilled in the art, the portions may have any shape, size and location in the IR image.

Figure 8A:
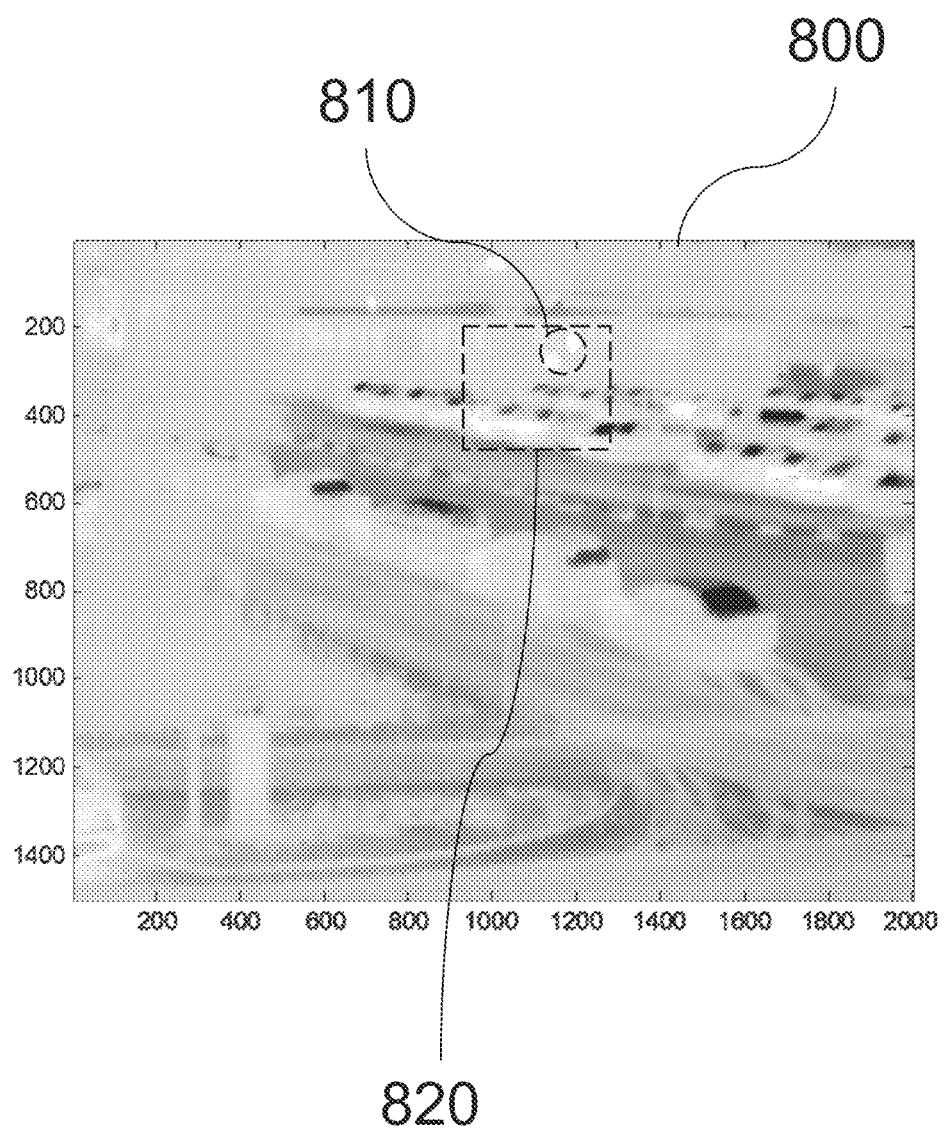
FIG. 8a shows an IR image according to an embodiment.
Figure 8B:
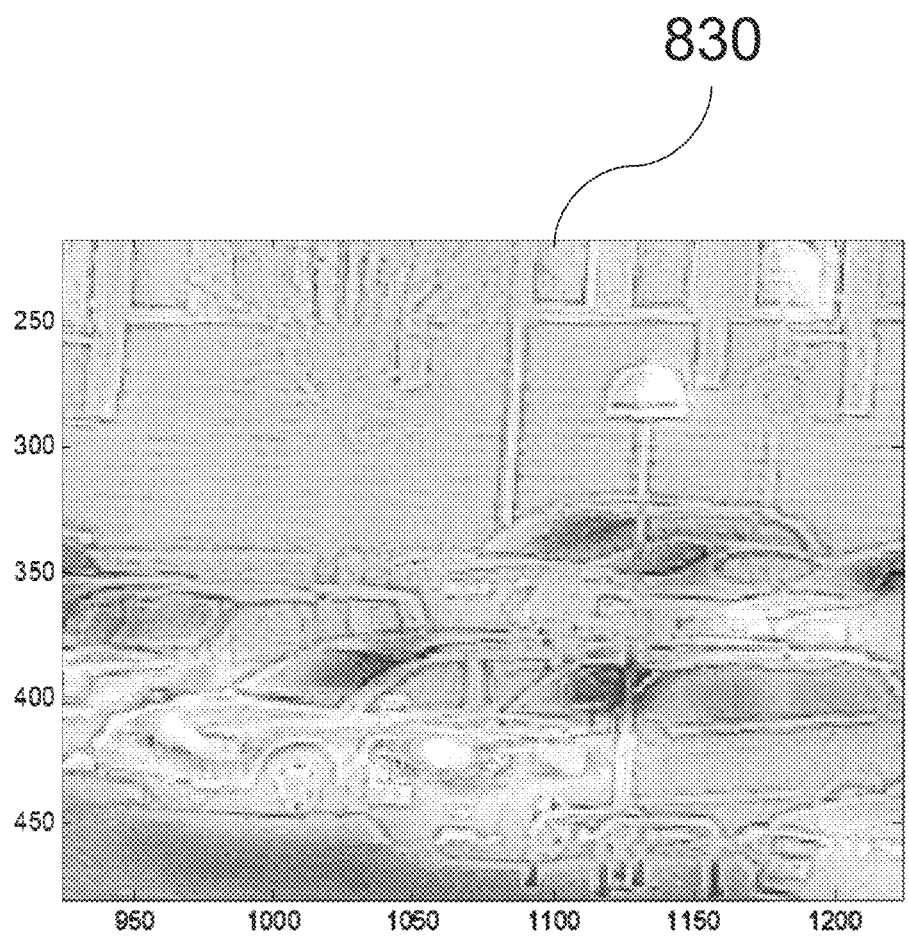
FIG. 8b shows a combined image according to an embodiment.

In FIGS. 7a and 7b, a low resolution IR image 700 of 32×32 pixels is shown. However, preferably the IR image from which a portion is selected or identified has a higher resolution, so that the selected or identified portion will have a resolution of at least 32×32 pixels. An example of a higher resolution IR image 800, showing a parking lot filled with cars, is shown in FIG. 8a. The resolution of the IR image 800 is indicated on its x and y axis, respectively. In image 800, two high intensity spots seemingly indicating hot spots on the wall of the house on the other side of the parking lot are marked by a circle 810. The circle is only there for visibility reasons. In a use case embodiment, the user may have identified the spots as interesting to investigate further. Therefore, the user selects an area or a portion 820 to zoom into and perform contrast/resolution enhancement on according to any of the method embodiments presented herein. In FIG. 8b, the resulting zoomed-in combined image 830 is shown. On the x and y axes of the combined image 830 it is indicated which part of the IR image 800 the selected portion represents. From the combined image 830, the user can easily see that the hotspots that were presumably located on the wall of the house are in fact street lights on the parking lot. Thereby, the user's understanding of the content shown in the IR image is enhanced through the presented method. In FIG. 8b, the combined image is shown in a zoomed-in form to the user, e.g. filling the entire display onto which the image is presented. Alternatively, the combined image may be presented as a picture in picture image, in the manner shown in FIG. 7a.

According to an embodiment, the combined image is scaled to completely fill the display. According to another embodiment, the combined image is windowed and scaled so that it matches the identified portion of the captured visual image. The combined image may according to this embodiment be displayed over the matching area of the visible-light image, thereby providing a picture in picture effect.

Standard image processing techniques, such as scaling and/or windowing for example, are used to fit the combined image into the desired area of the display.

Figure 4:
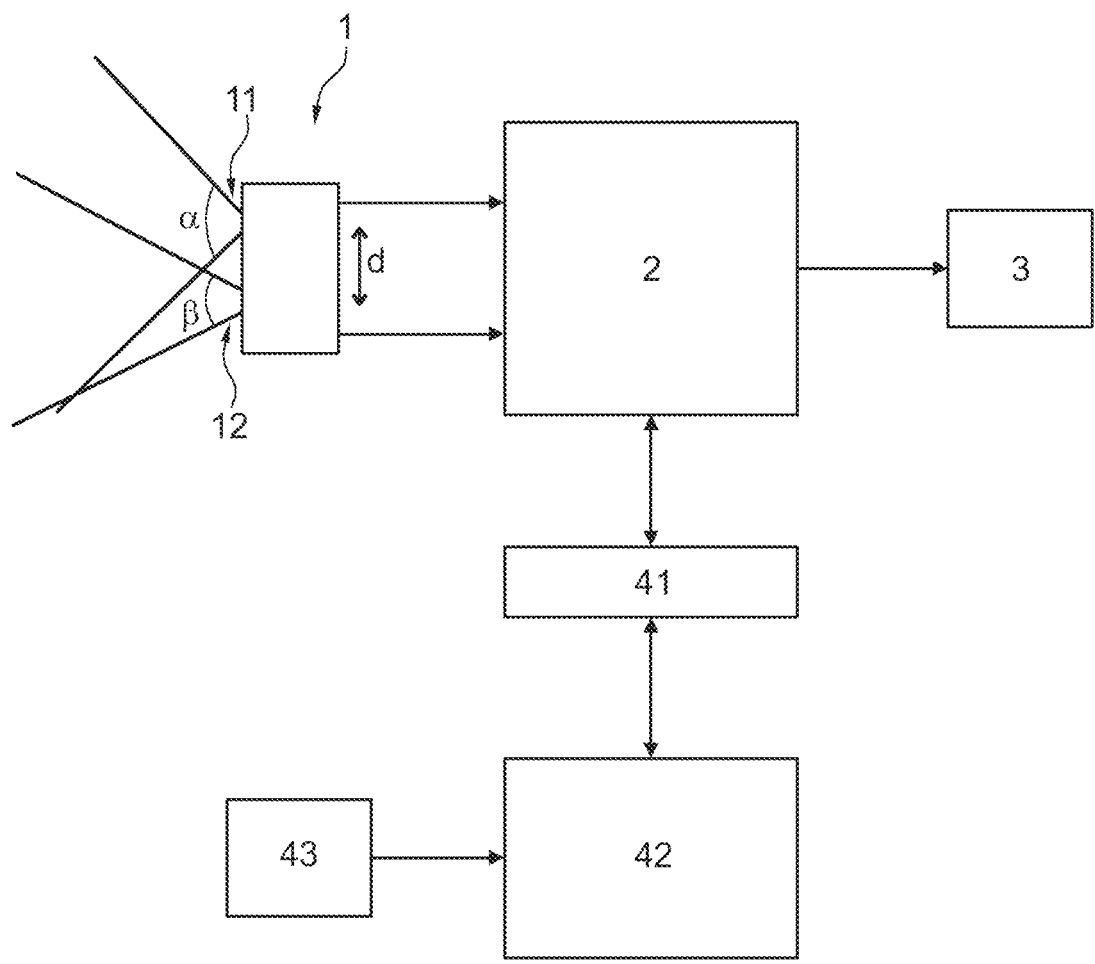
FIG. 4 shows an exemplary embodiment of an image processing system for performing a method according to an exemplary embodiment.
Figure 5A:
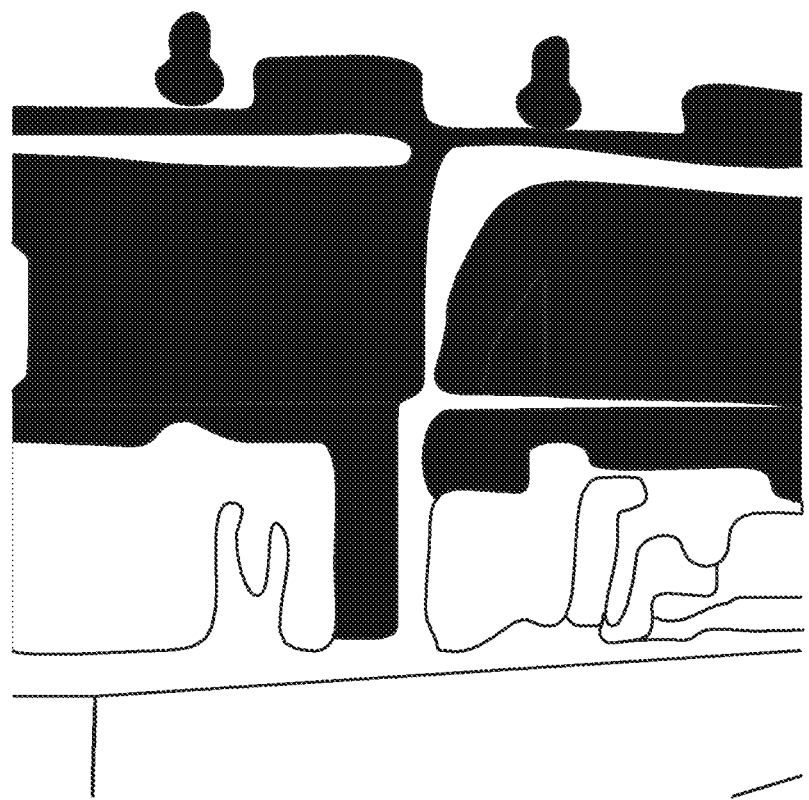
FIG. 5a shows the IR image of FIG. 3a with areas of different temperatures marked by different patterns.
Figure 5B:
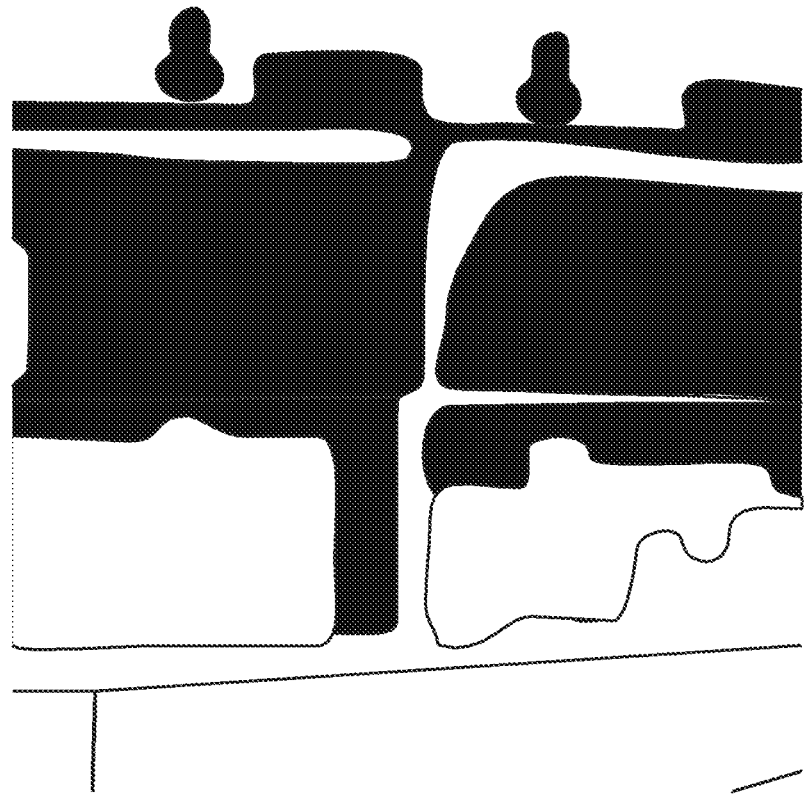
FIG. 5b shows the image of FIG. 3b with areas of different temperatures marked by different patterns.
Figure 5C:
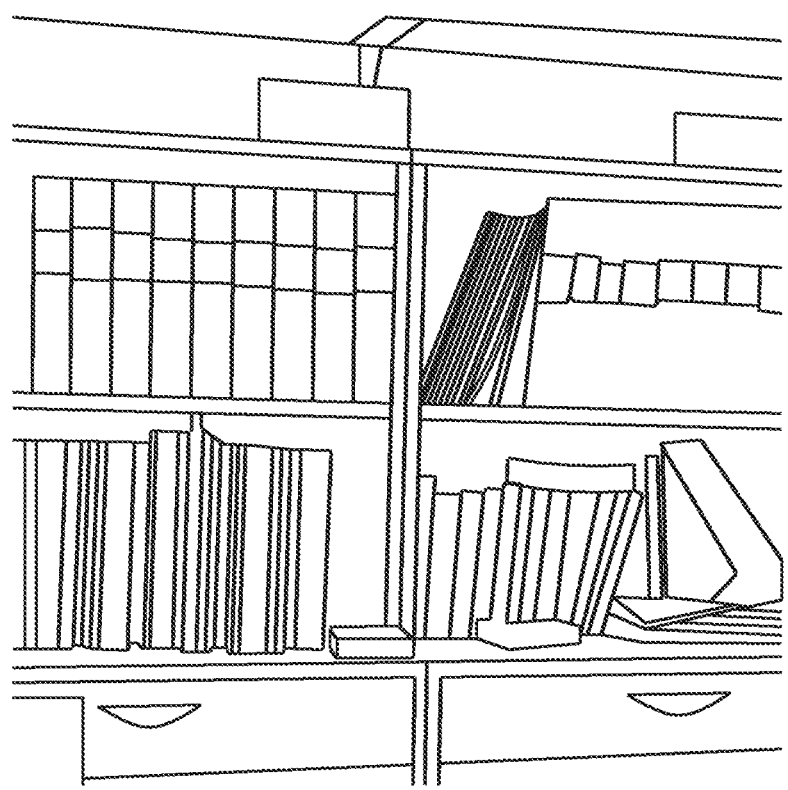
FIG. 5c shows the image of FIG. 3c.
Figure 5D:
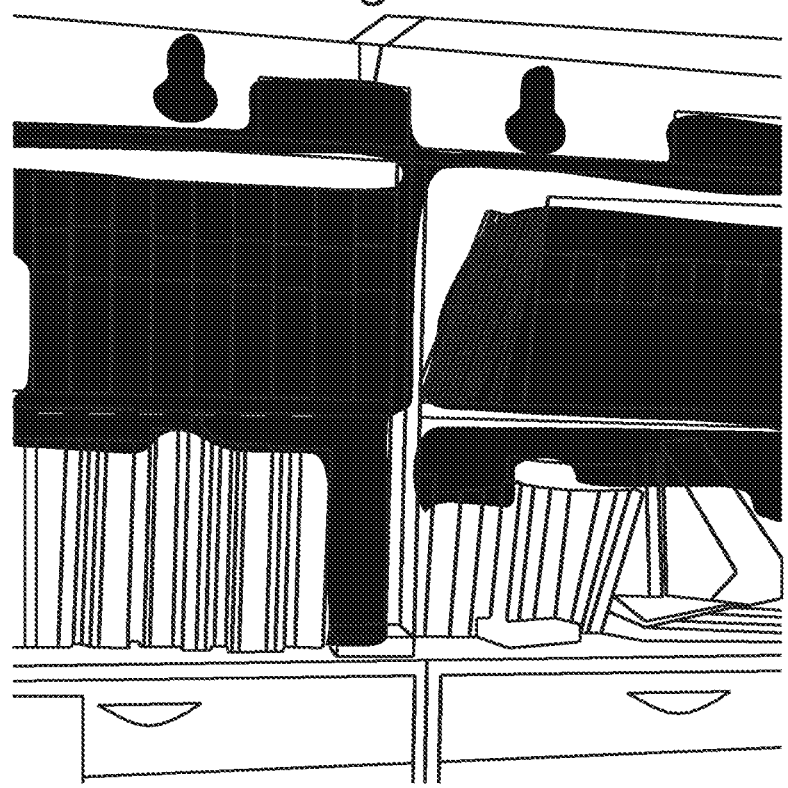
FIG. 5d shows the image of FIG. 3d with areas of different temperatures marked by different patterns.

According to an embodiment, the portion of the IR image may be selected by a user giving a selection input to the imaging device or imaging system for example using an input device integrated in or coupled to the imaging device unit (e.g., such as integrated in or coupled to control unit 42 and/or display 3 of FIG. 4 discussed further herein). The input device may be a selection of buttons, keyboard, soft buttons, a computer mouse, touch functionality, a joystick or any other input functionality that enables a user to perform a selection in interaction with a user interface wherein the IR image, the visual image or a combined version of the two, e.g. a blended or fused image, is shown. According to this embodiment, the method further comprises receiving a control signal indicating a manual selection of a portion of said IR image, generated by the input provided by the user.

According to another embodiment, said portion (e.g., portion 720) is predetermined or set to a default subpart of the captured IR image, for instance during design, production, and/or calibration of the imaging device unit. The predetermined portion may for instance be a subpart located in the center of the captured IR image, a subpart of the image wherein the outermost parts, e.g. a "frame" are not included, or in any other suitable area selected during setting of the predetermined portion. According to an embodiment, the predetermined portion may be indicated, marked, and/or highlighted in a graphical user interface integrated in or coupled to a display (e.g., such as integrated in or coupled to display 3 of FIG. 4 discussed further herein) showing the captured IR image or a blended, fused or picture in picture version of the captured IR and visual images. For instance, the predetermined portion may be marked by a frame or outline.

Herein, the term IR image may refer to the originally captured IR image, a portion of the originally captured IR image, or a scaled version of the portion of the IR image.

In one exemplary embodiment, the IR image may be re-sampled to increase or decrease its resolution. Typically, the resolution of a captured IR image has a different resolution than that of a captured visual image; usually the IR image has a lower resolution than the resolution of the visual image. A normal resolution for an IR image can for instance be 320×240 pixels, while a normal resolution for a visual image can be around 5 M pixels. If the resolutions of images to be combined are not substantially the same, at least one of them may have its resolution altered to match the other in order to compensate for the difference and more successfully combine the images. In one example, this may be done by up-sampling the IR image to the resolution of the visual image through interpolation. It is also possible to configure an imaging device with an IR sensor and a visual image sensor having substantially the same resolutions.

As an alternative to up-sampling the IR image, the visual image may be down-sampled to fit the resolution of the IR image, or both images can be sampled to fit a third resolution. Both images may originally have substantially the same resolution, or the resolution of the images may differ. After the resampling to fit the third resolution however, both images will have substantially the same resolution. This enables the images to be combined in a manner that is convenient and suitable regardless of how they are to be displayed.

If the combined image is to be stored and displayed by an IR camera, a PC or other device with a high resolution in for example image data structures and/or image display means, it can be convenient to up-sample the IR image to fit the generally higher resolution of the visual image. However, if the combined image is to be displayed by a system with much lower resolution, it may be more suitable to down-sample the visual image to fit this requirement. According to an exemplary embodiment, a third resolution may be selected to be the resolution of a display screen where the combined image is to be presented. Both images may originally have substantially the same resolution, or the resolution of the images may differ. It is, however, beneficial if the resolutions of the visual image and the IR image, respectively, are substantially the same before the images are to be combined, so that a suitable matching of data for each pixel of the images can be performed.

At block 105, the high spatial frequency content of the visual image may be extracted, for example by high pass filtering the visual image using a spatial filter. Besides high pass filtering, examples of methods for extracting high spatial frequency content in an image may include extracting the difference (commonly referred to as a difference image) between two images depicting the same scene, where a first image is captured at one time instance and a second image is captured at a second time instance, preferably close in time to the first time instance. The two images may typically be two consecutive image frames in an image frame sequence. High spatial frequency content, representing edges and contours of the objects in the scene, will appear in the difference image unless the imaged scene is perfectly unchanged from the first time instance to the second, and the imaging sensor has been kept perfectly still. The scene may for example have changed from one frame to the next due to changes in light in the imaged scene or movements of depicted objects. Also, in almost every case the imaging sensor will not have been kept perfectly still.

If the imaging device is handheld, it is evident that there will be movements caused by the user of the imaging device. If the camera is stationary, for example on a stand, vibrations of the imaging device or the surroundings may cause movements of the imaging sensor. Vibrations of the imaging device may for example be caused by image stabilization systems, which are commonly used in visual imaging devices in order to compensate for movements of the imaging device. Different ways of accomplishing image stabilization is well known in the art. In an imaging device having an image stabilization system, the imaging sensor may be placed on an element that enables moving the imaging sensor in response to measured movements of the imaging device. This construction could be used to capture edges/contours in difference images, if the movements of the imaging sensor are controlled to correspond to a certain, predefined difference between consecutive image frames. In this case, the difference may further correspond to a certain width of the edges/contours of the difference image, the width being chosen according to circumstances.

Another way of obtaining images from which a difference image can be derived is to use the focus motor of the imaging device to move one or more lenses of the imaging device. The use of a focus motor for moving lenses in an imaging device is well known in the art. In this case, an image captured by the imaging device when it is slightly out of focus would be a smoothed and de-noised image that could directly correspond to a low-pass filtered image. After the focus of the imaging device has been reset, a focused image may be captured and the high spatial frequency content of the focused image may be obtained by subtracting the out-of-focus image from the focused image.

The approaches of using vibrations of the imaging sensor of refocusing of one or more lenses in the imaging device further do not necessarily require any digital image processing and could therefore be used in connection with analog imaging devices. As is evident to a person skilled in the art, by subtracting the extracted high spatial frequency content obtained by any of the methods described above from an image a corresponding low-pass filtered version of the image is obtained, since only the lower spatial frequency content remains after the subtraction.

At block 106, the IR image may be processed in order to reduce noise in the image and/or blur the image, for example through the use of a spatial low pass filter. Low pass filtering may be performed by placing a spatial core over each pixel of the image and calculating a new value for said pixel by using values in adjacent pixels and coefficients of said spatial core. In another example, the images may be filtered using software alone.

A spatial low pass filter core can be a 3×3 filter core with the coefficient 1 in every position, and the filtered value of a pixel can be calculated by multiplying an original pixel value and eight adjacent pixels each by their filter coefficient, adding them together, and dividing by 9. After performing this operation for each pixel in an IR image, a low pass filtered image with a smoother appearance can be created. For high pass filtering an IR image, the same filter coefficients can be used, such that the high pass filtered image is formed by subtracting the low pass filtered image from the original image, one pixel at a time, in a manner well-known in the art. It is to be noted, however, that the coefficients of the filter core can be set to different values, and that a size of the filter core can be other than the 3×3 filter core described above. The resulting processed visual image and the possibly processed IR image may be combined at block 107. Before displaying the resulting combined image high resolution noise, for example high resolution temporal noise, may be added at block 108.

The step of performing filtering of the IR image at block 106 is optional. The method for an embodiment of the present invention gives beneficial effects on the resulting image shown to the user even without the filtering of the IR image and a user would be able to clearly discern objects in the imaged scene as well as temperature information of the imaged scene. The purpose of the low pass filtering performed at block 106 is to smooth out unevenness in the IR image from noise present in the original IR image captured at block 102. Since sharp edges and noise visible in the original IR image are removed or at least diminished in the filtering process, the visibility in the resulting image is further improved through the filtering of the IR image and the risk of double edges showing up in a combined image where the IR image and the visual image are not aligned is reduced.

A high pass filtering is performed for the purpose of extracting high spatial frequency content in the image, in other words locating contrast areas, i.e. areas where values of adjacent pixels display large differences, such as sharp edges. A resulting high pass filtered image can be achieved by subtracting a low pass filtered image from the original image, calculated pixel by pixel, as will also be described in detail below.

Figure 2:
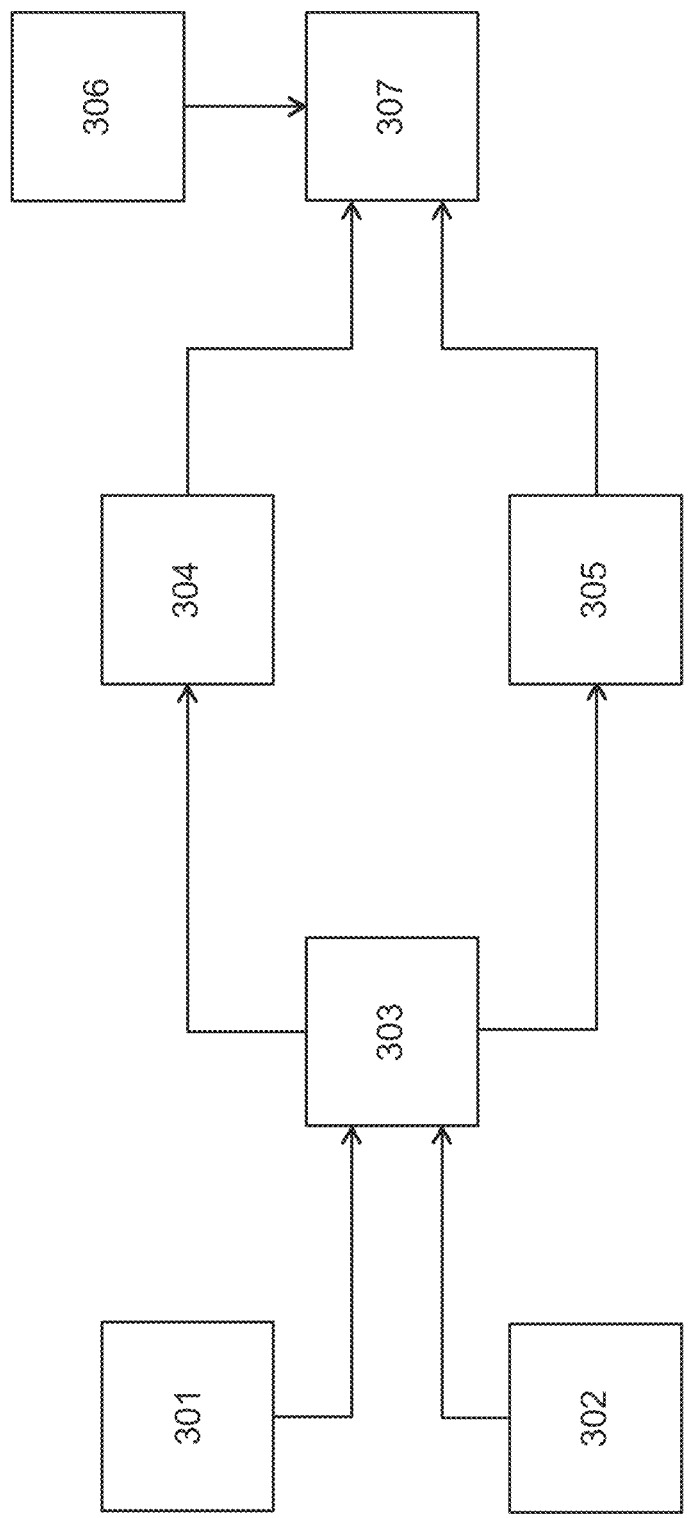
FIG. 2 shows a schematic view of a method with the images of the different stages of the method according to an exemplary embodiment.

As is readily apparent to a person skilled in the art, after the method steps according to any of the embodiments presented herein have been performed, the resulting image or parts of the resulting image may be further processed according to methods per se known in the art. FIG. 2 shows an exemplary embodiment of images that are produced at different blocks of the method illustrated by FIG. 1. A visual image 301 that is captured at block 101 and an IR image 302 captured at block 102 are used as input for up-sampling and filtering during processing 303, corresponding to blocks 103, 104, 105, 106.

After processing 303, extracted high spatial frequency content 304 of the visual image is shown, where the contours of objects present in the original visual image 301 can be seen. According to an exemplary embodiment of the present invention, the IR image 302 is processed into a low pass filtered and up-sampled image 305. The up-sampling has increased the resolution of the image and now each object in the imaged scene can be seen more clearly, without showing much noise in the form of blurs or graininess in the low pass filtered image 305. Arrows from the extracted high spatial frequency content of the visual image 304 and the low pass filtered IR image 305 that can now be described as processed images 304, 305, indicate a combination of these images 304, 305 to form a combined image 307 where the processed IR image 305, displaying the smooth temperature distribution in the imaged scene is combined with the processed visual image 304 where the contours or edges from objects of the original visual image 301 are also shown. The combined image 307 thus displays the advantages of the IR image 302, where any differences in temperature across the objects are shown, with the contours from the processed visual image 304 in order to show the shape of each object more clearly. The combination is preferably performed through either superimposing the high spatial frequency content of the visual image on the IR image, or alternatively superimposing the JR image on the high spatial frequency content of the visual image.

According to an exemplary embodiment of the present invention, the IR image may be captured with a very low resolution IR imaging device, the resolution for instance being as low as 64×64 or 32×32 pixels, but many other resolutions are equally applicable, as is readily understood by a person skilled in the art.

According to another embodiment, a portion of the IR image having a size of 64×64 pixels or less, or even 32×32 pixels or less, is identified in the IR image. According to an embodiment, the location/area in the IR image representing the portion may be predetermined or determined based on manual input.

Figure 6A:
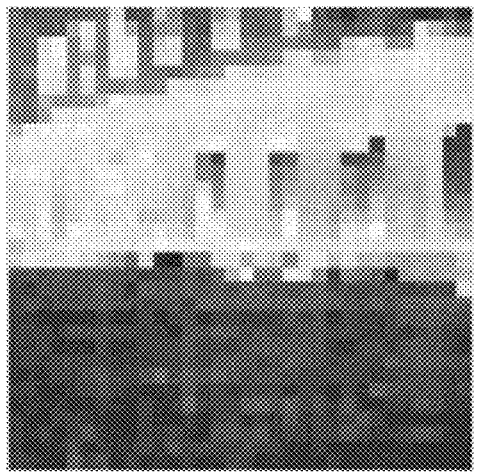
FIG. 6a shows a low resolution IR image of a scene. The shown image has a resolution of 32×32 pixels.
Figure 6B:
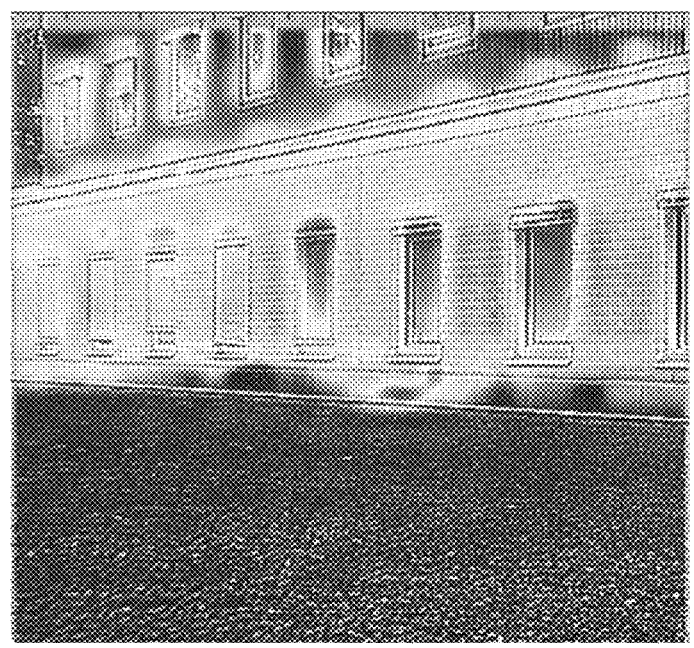
FIG. 6b shows the IR image of FIG. 6a after the IR image has been re-sampled, processed and combined with extracted high spatial frequency content of a visual image depicting the same scene.

A 32×32 pixel IR image in itself contains very little information and it is hard for a viewer to interpret the information in the image. An example of an IR image having the resolution of 32×32 pixels is shown in FIG. 6a. The inventor has found that if edge and contour (high spatial frequency) information is added to the combined image from the visual image, the use of a very low resolution IR image will still render a combined image where the user can clearly distinguish the depicted objects and the temperature or other IR information related to them. FIG. 6b shows the IR image of FIG. 6a after the IR image has been re-sampled and combined with extracted high spatial frequency content of a visual image depicting the same scene. This enables the inventive method for an embodiment to be used in combination with very small and inexpensive image detectors, still rendering very advantageous results.

According to another exemplary embodiment, the IR image may be captured with a high resolution IR imaging device. As the technology advances, IR imaging devices continue to get higher resolution. A high resolution IR imaging device today would for instance have a resolution of 640×640 pixels. An IR image captured with such a high resolution imaging device may possibly in itself be sufficient to show edge and contour information to a viewer. By combining such a high resolution IR image with the high spatial frequency content of a corresponding visual image may enable the viewer to see further details of the visual image, not shown in the IR image. For example, an area where water damage has been identified may be drawn/outlined on a wall using a pen. This information may be advantageous to have in combination with the measured temperature information. In another example, there may be a serial number or other identifying letters or digits in the image that may help in identifying the depicted scene or objects in the scene. A high resolution IR image may further advantageously be down-sampled and/or de-noised/low pass filtered to a high degree, whereby the resulting processed IR image would contain a very low level of noise, but still has very high sensitivity when it comes to the temperature information of the depicted scene.

High resolution noise 306 may be added to the combined image 307, corresponding to block 108, in order to render the resulting image more clearly to the viewer and to decrease the impression of smudges or the like that may be present due to noise in the original IR image 302 that has been preserved during the low pass filtering of said IR image 302.

FIG. 3a shows an IR image 302 immediately after capture at block 102. The imaged scene represents a bookcase with binders arranged in rows and with shelves fitted at certain heights. As can be seen, the objects in the scene are at different temperatures, shown as different sections, where the uppermost parts of the image and the binders placed on the middle shelf are warmer than the lower shelf or the areas beside and above the binders. The actual shapes of the objects depicted are difficult to discern, since no contours of the objects other than the lines between different temperatures are displayed. It would therefore be very difficult for a user confronted with this image alone to identify a specific object of a certain temperature. The IR image has been colored according to a chosen color space (described further below), by adding color to the signal after filtering.

Figure 3B:
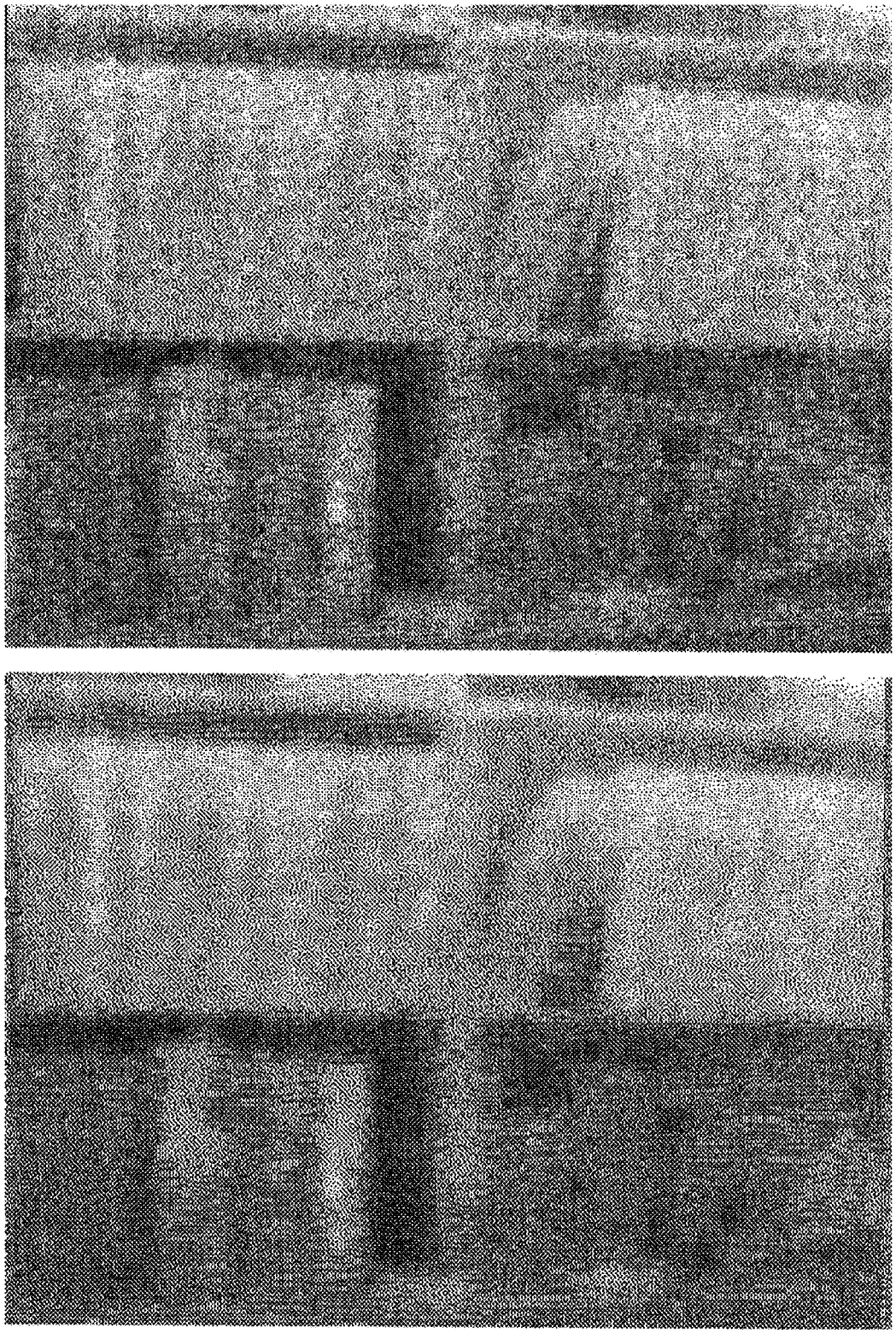
FIG. 3b shows the IR image of FIG. 3a in halftone after low pass filtering.

In an exemplary embodiment of the present invention, the captured IR image is processed through low pass filtering. FIG. 3b shows a low pass filtered IR image 305. The spatial filtering has smoothed out unevenness in the captured IR image 302 and thereby made it easier to differentiate between different objects in the scene. Further, the filtering has removed noise from the image 302. Also, the edges between these objects have been smoothed out. This may be done since contours are to be added from the filtered visual image 304, and any alignment error between the images would otherwise result in double contours that might be distracting to a viewer.

In an exemplary embodiment of the present invention, the high spatial frequency content of the captured visual image is extracted by high pass filtering of the visual image. Such a high pass filtered visual image 304 that is the result of high pass filtering the captured visual image 301, is shown in FIG. 3c. In the high pass filtered visual image 304, mainly the contours and edges of the objects in the scene imaged in the original visual image 301 can be seen. The contours of and edges between objects as well as lines such as text on the binders or patterns from the books are visible.

Figure 3D:
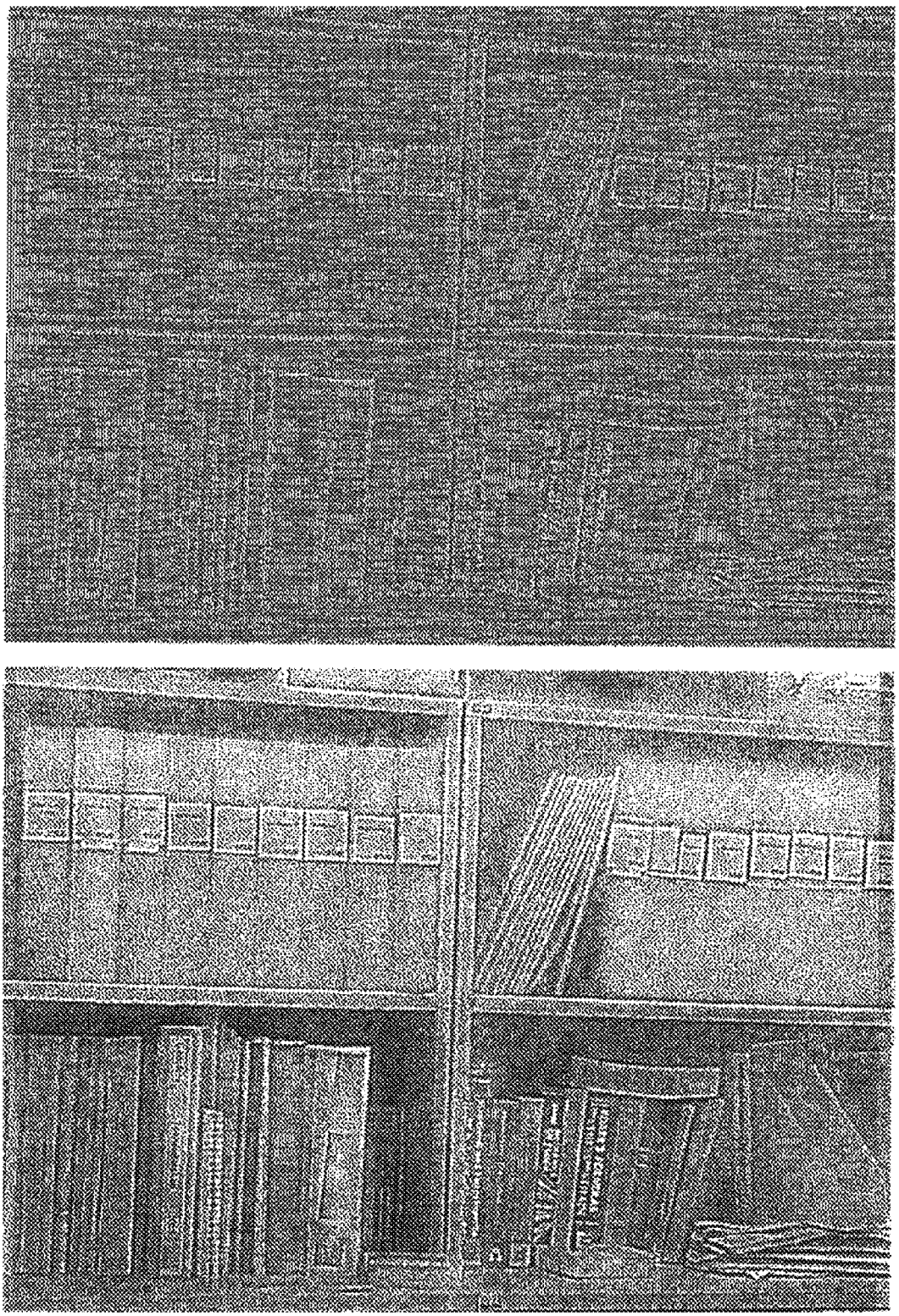
FIG. 3d shows a combination of the low pass filtered IR image of FIG. 3b with the high pass filtered visual image of FIG. 3c in halftone.

FIG. 3d shows a combined image 307 after the original IR image 302 has been up-sampled, low pass filtered, and combined with a high pass filtered visual image of the same scene. The areas of different temperatures can still be seen, but the borders between them have become clearer and contour lines for the binders and the shelves have been added, originating from the high pass filtered visual image and showing details that cannot be seen in an IR image, such as text or other visual patterns. An increased clarity also comes from the low pass filtering of the IR image, where noisy pixels within larger fields of different temperature have been smoothed out to form larger areas that are more similar. As a result, at least a portion of the noise that may arise from the conditions under which the original image was captured can be eliminated.

FIGS. 5a-5d depict the images of FIGS. 3a-3d described above, but in a manner where areas of different temperature are marked by different patterns, instead of in halftone. Everything that is said with reference to FIGS. 3a-3d can thus be directly applied to FIGS. 5a-5d, respectively.

The low pass filtering that is performed on the IR image 302 may be performed by using a spatial filter with a suitable filter core, in order to calculate a new value for each pixel depending on the previous value and those of the surrounding pixels. The high pass filtering is generally performed by applying a low pass filter and subtracting the resulting low pass filtered image from the original image, leaving only lines and edges to be seen in the high pass filtered image. As previously mentioned, methods of applying spatial filters are well known in the art and any such method may be used.

When choosing a palette, for instance according to the YCbCr family of color spaces, the Y component (i.e. the luminance) may be chosen as a constant over the entire palette. In one example, the Y component may be selected to be 0.5 times the maximum luminance. As a result, when combining the IR image according to the chosen palette with the visual image, the Y component of the processed visual image 304 can be added to the processed IR image 305 and yield the desired contrast without the colors of the processed IR image 305 being altered. The significance of a particular nuance of color is thereby maintained during the processing of the original IR image 302.

When calculating the color components, the following equations can be used to determine the components Y, Cr and Cb for the combined image 307 with the Y component from the high pass filtered visual image 304 and the Cr and Cb components from the signal of the IR image 305.

$$hp\_y\_vis = highpass(y\_vis)$$

$$(y\_ir, cr\_ir, cb\_ir) = colored(lowpass(ir\_signal\_linear))$$

which in another notation would be written as:

$$hp_{y_{vis}} = highpass(y_{vis})$$

$$(y_{ir}, cr_{ir}, cb_{ir}) = colored(lowpass(ir_{signal\ linear}))$$

Other color spaces than YCbCr can, of course, also be used with embodiments of the present disclosure. The use of different color spaces, such as RGB, YCbCr, HSV, CIE 1931 XYZ or CIELab for instance, as well as transformation between color spaces is well known to a person skilled in the art. For instance, when using the RGB color model, the luminance can be calculated as the mean of all color components, and by transforming equations calculating a luminance from one color space to another, a new expression for determining a luminance will be determined for each color space.

In one embodiment, block 107 of combining the processed visual image 304 with the processed IR image 305 can be performed using only the luminance component Y from the processed visual image 304.

It is to be noted that the blocks of the method described above can be performed in different order if suitable in accordance with one or more embodiments.

FIG. 4 shows a schematic view of an embodiment of an image processing system for performing a method according to the present disclosure. An imaging device unit 1 may comprise a visual imaging device 11 having a visual sensor and an IR imaging device 12 having an IR sensor that are mounted so that an optical axis of the visual sensor of visual imaging device 11 is at a distance d from the IR sensor of IR imaging device 12. The visual imaging device may be any known type of visual imaging device, for example a CCD imaging device, an EMCCD imaging device, a CMOS imaging device or an sCMOS imaging device. The IR imaging device may be any kind of imaging device that is able to detect electromagnetic radiation at least, for example, in the interval between 0.7 and 20 µm. The visual imaging device has a visual field of view α of approximately 53°, while the IR imaging device has a visual field of view β of approximately 24°. It should be appreciated by one of ordinary skill that other viewing angles may be used, for example through use of replaceable optical elements or lenses including optical elements. For IR imaging devices, replaceable optical elements or lenses including optical elements may for instance render a field of view of 15-45°.

Blocks 101, 102, i.e. the capturing of a visual image 301 and an IR image 302 may be performed by the imaging device unit 1, and the captured images are transmitted to a processing unit 2, also referred to as a processor, where the remaining blocks are performed. According to a further embodiment, the optional step in block 106 of FIG. 1, i.e. reducing noise and blurring a captured IR image, may be performed by image processing means or an image processor incorporated in the imaging device, where after the visual image and the processed IR image are transmitted to a processing unit 2, where the method steps of the remaining blocks of FIG. 1 are performed. Said processing unit 2 may be a processor such as a general or special purpose processing engine such as, for example, a microprocessor, microcontroller or other control logic or an FPGA unit (Field-programmable gate array) that comprises sections of code, stored on a computer readable storage medium, that are fixed to perform certain tasks but also other sections of code, stored on a computer readable storage medium, that can be altered during use. Such alterable sections can comprise parameters that are to be used as input for the various tasks, such as the calibration of the IR imaging device 12, the alignment for the visual imaging device 11 and IR imaging device 12, the sample rate or the filter for the spatial filtering of the images, among others.

In this document, the terms "computer program product" and "computer-readable storage medium" may be used generally to refer to non-transitory media such as memory 41, the storage medium of processing unit 2, or the storage medium of control unit 42. These and other forms of computer-readable storage media may be used to provide instructions to processing unit 2 for execution. Such instructions, generally referred to as "computer program code" or computer program code portions (which may be grouped in the form of computer programs or other groupings) are adapted to control a data processing system to perform any or all of the method steps and functions of the inventive method, as described above. Thus when executed, the computer program code portions enable the imaging device unit 1 or a computer to perform features or functions of embodiments of the current technology. Further, as used herein, processing logic or logic may include hardware, software, firmware, or a combination of thereof.

The processing unit 2 communicates with a memory 41 where such parameters are kept ready for use by the processing unit 2, and where the images being processed by the processing unit 2 can be stored if the user desires. Memory 41 may be a random access memory (RAM), a register memory, a processor cache, a hard disk drive, a floppy disk drive, a magnetic tape drive, an optical disk drive, a CD or DVD drive (R or RW), or other removable or fixed media drive. The memory 41 in turn communicates with a control unit 42 where said parameters originate, for instance through input from a calibration file 43 that can be supplied from a manufacturer, by parameters being supplied by the image processing system itself, such as for instance data from a sensor or the like regarding the distance from the imaging device unit 1 to an object whose image is captured, or by parameters being supplied by the user. The control unit 42 can be a programmable unit and determine the parameters needed for performing exemplary methods and how such parameters should interact with the processing unit 2 and store these parameters in the memory 41 for easy retrieval by the processing unit 2.

After the processing unit 2 has performed the operation of aligning the images (block 103), up-sampling the original IR image 302 to generate an up-sampled IR image (block 104), high pass filtering of the original visual image 301 to generate a processed visual image 304 (block 105), low pass filtering of the up-sampled IR image to generate a processed IR image 305 (block 106), combining the processed visual image 304 with the processed IR image 305 to generate a combined image 307 (block 107), and adding high frequency noise to this combined image 307 (block 108), the resulting image is presented in a display unit 3 in order to be viewed by the user of the image processing system. If desired, the user can save the combined image 307 or any of the other images corresponding to the different method steps to the memory 41 for later viewing or for transfer to another unit, such as a computer, for further analysis and storage.

According to embodiments of the present invention, the processing unit 2 may be adapted or configured to perform any or all of the method steps or functions described above.

In an alternative embodiment, disclosed methods can be implemented by a computing device such as a PC that may encompass the functions of an FPGA-unit specially adapted for performing the steps of the method for one or more embodiments of the present invention, or encompass a general processing unit 2 according to the description in connection with FIG. 4. The computing device may further comprise the memory 41 and control unit 42 and also the display unit 3. It would be possible to use the disclosed methods live, i.e. for a streamed set of images filtered and combined in real time, for instance at 30 Hz, that can be recorded and replayed as a movie, but it would also be possible to use still pictures.

In one example, the user may be allowed to alter a positive factor alpha for determining how much of the luminance from the visual image 301, 304 that is to be used for combining with the IR image 302, 305, for instance by using the equation below. The luminance Y of the combined image 307 is achieved by adding the luminance of the processed IR image 305 to the luminance of the highpass filtered visual image multiplied by a factor alpha. The combined components Cr and Cb are taken directly from the IR image 302, 305 and are therefore not affected by this process. If another color space is used, the equations are of course transformed before use.

$$comb\_y = y\_ir + alpha \times hp\_y\_vis$$

$$comb\_cr = cr\_ir$$

$$comb\_cb = cb\_ir$$

which in another notation would be written as:

$$comb_y = y_{ir} + alpha * hp_{y_{vis}}$$

$$comb_{cr} = cr_{ir}$$

$$comb_{cb} = cb_{ir}$$

The variation of alpha thus gives the user an opportunity to decide how much contrast is needed in the combined image. With an alpha of close to zero, the IR image alone will be shown, but with a very high alpha, very sharp contours can be seen in the combined image. Theoretically, alpha can be an infinitely large number, but in practice a limitation will probably be necessary, to limit the size of alpha that can be chosen to what will be convenient in the current application.

The up-sampling of the resolution of the IR image 302 at block 104 can alternatively be performed as a down-sampling of the visual image 301 to match the resolution of the IR image 302, or indeed a combination of an up-sampling of the IR image 302 and a down-sampling of the visual image 301 to a resolution that none of the images 301, 302 originally have, as long as the result is that the IR image 302 and the visual image 301 have the same resolution after the sampling step. It may be convenient to determine the resolution depending on the display area such as the display unit 3 where the combined image 307 is to be displayed and to sample the image or images 301, 302 to match the resolution to the most suitable for the display unit 3.

It will be appreciated that, for clarity purposes, the above description has described embodiments of the technology with reference to different functional units and processors. However, it will be apparent that any suitable distribution of functionality between different functional units, processors or domains may be used without detracting from the technology. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The present disclosure is not to be seen as limited by the embodiments described above, but can be varied within the scope of the claims, as will be readily understood by the person skilled in the art.

The invention claimed is:

1. A system comprising:
    an infrared imaging device configured to capture an infrared (IR) image of a scene;
    a visual imaging device configured to capture a first visual image of at least a portion of the scene; and
    a logic device configured to:
        determine high spatial frequency content associated with the first visual image;

generate a combined image based on a luminance component of the IR image and the high spatial frequency content of the first visual image;
add high frequency noise to the combined image to obtain a processed combined image; and
provide the processed combined image for display by a display unit,
wherein the high spatial frequency content of the first visual image comprises contours and/or edges of the scene captured in the first visual image.

2. The system of claim 1, wherein the combined image is based only on the IR image and a luminance component of the high spatial frequency content of the first visual image.

3. The system of claim 2, wherein the logic device is further configured to process the IR image according to a color space to obtain a colored IR image, wherein the logic device is configured to generate the combined image based on a luminance component of the colored IR image and the luminance component of the high spatial frequency content of the first visual image, and wherein the color space is one of a YCbCr color space, an RGB color space, an HSV color space, a CIE 1931 color space, a CIE 1931 XYZ color space, or a CIELab color space.

4. The system of claim 2, wherein the logic device is configured to generate a luminance component of the combined image based on a sum of the luminance component of the IR image and a scaled version of the luminance component of the high spatial frequency content of the first visual image.

5. The system of claim 4, wherein the scaled version of the luminance component of the high spatial frequency content of the first visual image is based on a product between the luminance component of the high spatial frequency content of the first visual image and a contrast factor, and wherein the logic device is configured to determine the high spatial frequency content of the first visual image at least by high pass filtering the first visual image or based on a difference image generated from the first visual image and a second visual image.

6. The system of claim 2, wherein the logic device is configured to add the high spatial frequency content of the first visual image only to a subset of pixels of the IR image to generate the combined image such that the combined image comprises the IR image with the subset of pixels altered to include the high spatial frequency content but remaining pixels of the IR image are preserved.

7. The system of claim 2, wherein the logic device is configured to generate the combined image by combining the IR image with the first visual image, wherein the IR image comprises color data, wherein the combined image comprises the color data of the IR image such that the color data of the IR image is preserved in the combined image.

8. The system of claim 2, wherein the logic device is configured to generate a luminance component of the combined image based only on the luminance component of the IR image and the luminance component of the high spatial frequency content of the first visual image.

9. The system of claim 2, wherein a color component of the combined image is based only on a corresponding color component of the IR image.

10. The system of claim 2, wherein:
the logic device is further configured to generate a difference image based on the first visual image and a second visual image; and
the logic device is configured to determine the high spatial frequency content of the first visual image based on the difference image.

11. The system of claim 2, wherein:
the logic device is further configured to:
up-sample the IR image to obtain an up-sampled IR image; and
low pass filter the up-sampled IR image to obtain a low-pass filtered IR image; and
the logic device is configured to generate the combined image based on a luminance component of the low-pass filtered IR image and the high spatial frequency content of the first visual image.

12. The system of claim 2, wherein differences in temperature displayed in different colors or greyscale levels are preserved between the IR image and the combined image.

13. The system of claim 2, wherein the logic device is further configured to align the IR image with the first visual image at least by compensating for a parallax and/or pointing errors due to a difference between a respective optical axis of the infrared imaging device and the visual imaging device.

14. A method comprising:
receiving an infrared (IR) image of a scene captured using a first imaging device;
receiving a first visual image of at least a portion of the scene captured using a second imaging device;
determining high spatial frequency content associated with the first visual image, wherein the high spatial frequency content of the first visual image comprises contours and/or edges of the scene captured in the first visual image;
generating a combined image based only on the IR image and a luminance component of the high spatial frequency content of the first visual image;
adding high frequency noise to the combined image to obtain a processed combined image; and
providing the processed combined image for display by a display unit.

15. The method of claim 14, further comprising processing the IR image according to a palette to obtain a colored IR image, wherein the combined image is generated based on a luminance component of the colored IR image and the luminance component of the high spatial frequency content of the first visual image.

16. The method of claim 14, wherein a palette associated with the IR image is the same as a palette associated with the combined image, wherein the palette is a color palette or a grey scale palette, wherein a representation of temperature variations in the scene is based on the palette, and wherein the combined image is generated based on a luminance component of the IR image and the luminance component of the high spatial frequency content of the first visual image.

17. The method of claim 14, further comprising generating a difference image based on the first visual image and a second visual image, wherein the high spatial frequency content of the first visual image is determined based on the difference image, wherein a color component of the combined image is based only on a corresponding color component of the IR image.

18. The method of claim 14, wherein differences in temperature displayed in different colors or greyscale levels are preserved between the IR image and the combined image.

* * * * *

UNITED STATES PATENT AND TRADEMARK OFFICE
CERTIFICATE OF CORRECTION

PATENT NO. : 11,514,563 B2
APPLICATION NO. : 16/372260
DATED : November 29, 2022
INVENTOR(S) : Katrin Strandemar It is certified that error appears in the above-identified patent and that said Letters Patent is hereby corrected as shown below:

In the Specification

In Column 1, Lines 7-8, change "patent application Ser. No." to --Patent Application No.--.

In Column 1, Line 9, change "patent application Ser. No." to --Patent Application No.--.

In Column 1, Line 10, change "patent application Ser. No." to --Patent Application No.--.

In Column 1, Line 11, change "patent application Ser. No." to --Patent Application No.--.

In Column 1, Line 12, change "patent application Ser. No." to --Patent Application No.--.

In Column 1, Line 13, change "patent application Ser. No." to --Patent Application No.--.

In Column 1, Lines 14-15, change "patent application Ser. No." to --Patent Application No.--.

In Column 1, Lines 15-16, change "patent application Ser. No." to --Patent Application No.--.

In Column 1, Line 18, change "patent application Ser. No." to --Patent Application No.--.

In Column 1, Line 19, change "patent application Ser. No." to --Patent Application No.--.

In Column 1, Lines 22-23, change "patent application Ser. No." to --Patent Application No.--.

In Column 2, Lines 23-24, change "patent application Ser. No." to --Patent Application No.--.

In Column 2, Line 25, change "patent application Ser. No." to --Patent Application No.--.

In Column 13, Line 38, change "superimposing the JR image" to --superimposing the IR image--.

Signed and Sealed this
Seventeenth Day of January, 2023

Katherine Kelly Vidal
*Director of the United States Patent and Trademark Office*